United States Patent
Lakshmanan et al.

(10) Patent No.: US 11,349,885 B2
(45) Date of Patent: May 31, 2022

(54) SCALABLE LAYERED TWO-DIMENSIONAL (2D) TELECOMMUNICATIONS NETWORK ARCHITECTURE

(71) Applicant: Portly, Inc., Lafayette, CO (US)

(72) Inventors: Balaji Lakshmanan, Rancho Palos Verdes, CA (US); Theodore F. Heieck, Lafayette, CO (US)

(73) Assignee: Portly, Inc., Lafayette, CO (US)

( * ) Notice: Subject to any disclaimer, the term of this patent is extended or adjusted under 35 U.S.C. 154(b) by 0 days.

(21) Appl. No.: 17/221,795

(22) Filed: Apr. 3, 2021

(65) Prior Publication Data
US 2021/0227004 A1 Jul. 22, 2021

Related U.S. Application Data

(63) Continuation of application No. 15/888,070, filed on Feb. 4, 2018, now Pat. No. 11,063,988.

(51) Int. Cl.
| | |
|---|---|
| *H04L 65/1069* | (2022.01) |
| *H04L 47/724* | (2022.01) |
| *H04L 65/10* | (2022.01) |
| *H04L 65/65* | (2022.01) |

(52) U.S. Cl.
CPC ........ *H04L 65/1069* (2013.01); *H04L 47/724* (2013.01); *H04L 65/1013* (2013.01); *H04L 65/1006* (2013.01); *H04L 65/608* (2013.01)

(58) Field of Classification Search
CPC .............. H04L 65/1069; H04L 47/724; H04L 65/1013; H04L 65/1006; H04L 65/608
See application file for complete search history.

(56) References Cited

U.S. PATENT DOCUMENTS

2008/0162720 A1 * 7/2008 Gulati ................ H04L 65/1069
709/238

* cited by examiner

*Primary Examiner* — Brian Whipple
(74) *Attorney, Agent, or Firm* — Alonzo & Associates; Arlyn Alonzo

(57) ABSTRACT

Aspects of the disclosure are directed to a telecommunications network architecture. In accordance with one aspect, a scalable telecommunications network architecture includes at least one infrastructure switching node; at least one user switching node for receiving a session request, wherein the session request includes at least one user attribute; and at least one controller coupled to the at least one user switching node, the at least one controller for examining the session request a) to allocate at least one bandwidth or at least one data rate for the at least one user switching node based on a resource allocation policy and b) to allocate a quantity of switch elements in the at least one infrastructure switching node based on an interconnection policy. In one example, the at least one controller establishes a communications session for a user terminal based on the session request.

20 Claims, 5 Drawing Sheets

SCALABLE LAYERED TWO-DIMENSIONAL (2D) TELECOMMUNICATIONS NETWORK ARCHITECTURE

CLAIM OF PRIORITY

This application is a continuation application of patent application Ser. No. 15/888,070 filed Feb. 4, 2018, the entire contents of the prior application are incorporated herein by reference as if fully set forth below in its entirety and for all applicable purposes.

TECHNICAL FIELD

This disclosure relates generally to the field of telecommunications network architecture, and, in particular, to a scalable two-dimensional telecommunications network architecture.

BACKGROUND

Telecommunications networks provide communication connectivity among a plurality of spatially distributed user terminals that need to communicate with each other. Telecommunications networks may be represented abstractly by a network topology with three fundamental elements: user terminals, transmission links and switching nodes. Switching nodes are used to interconnect transmission links to form communication paths between user terminals. Typically, user terminals in a communications session interconnect with each other using a configuration of transmission links and switching nodes which provide a communication path between two or more user terminals. Scalability, i.e., the ability to expand in size or scope seamlessly, is an important feature desired in modern networks. Scalability allows the capacity of the network to increase, i.e. more traffic may be carried by shared resources. There are several factors which restrict the scalability or capacity of the network. For example, the scalability of the telecommunications network may be limited by the capability of the switching nodes, i.e., the network may be switch-limited, or may be limited by the capability of the transmission links, i.e., the network may be link-limited. If the network is switch-limited, the network is not constrained by transmission link capability but by the switching node capability. Thus, there is a strong desire for scalable telecommunications switch architectures which overcome switching node capability.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a scalable two-dimensional telecommunications network architecture. Accordingly, a scalable telecommunications network architecture including at least one infrastructure switching node; at least one user switching node for receiving a session request, wherein the session request includes at least one user attribute; and at least one controller coupled to the at least one user switching node, the at least one controller for examining the session request a) to allocate at least one bandwidth or at least one data rate for the at least one user switching node based on a resource allocation policy and b) to allocate a quantity of switch elements in the at least one infrastructure switching node based on an interconnection policy.

In one example, the session request is sent by a user terminal. In one example, the at least one controller establishes a communications session for the user terminal based on the session request. In one example, the at least one controller acknowledges the session request with an acknowledgement message containing information relating to allocation to the user terminal. In one example, the user terminal is a plurality of user terminals. In one example, the session request is a composite of multiple session requests from the plurality of user terminals, with each of the multiple session requests corresponding to each of the plurality of user terminals.

In one example, the resource allocation policy includes a user terminal quantity of the plurality of user terminals that will participate in the communications session, and wherein based on the resource allocation policy, the at least one controller determines a first quantity of user connections and a second quantity of user switching nodes. In one example, the resource allocation policy includes a user terminal quantity of the plurality of user terminals and a user switching node quantity of the at least one user switching node that will participate in the communications session, and wherein based on the resource allocation policy, the at least one controller determines one or more of the following: a media plane bandwidth or a media plane data rate. In one example, the resource allocation policy includes geographic locations of each of the plurality of user terminals and geographic locations of the at least one user switching node, and wherein based on the resource allocation policy, the at least one controller assigns the at least one user switching node to one or more of the plurality of user terminals.

In one example, the interconnection policy includes a user terminal quantity of the plurality of user terminals that will participate in the communications session and wherein based on the interconnection policy, the at least one controller allocates a quantity of switch elements in the at least one infrastructure switching node for the communications session. In one example, the quantity of switch elements is proportional to the user terminal quantity.

In one example, the at least one user attribute includes one or more of the following: the quantity of user terminals that will participate in a communications session, the geographic locations of a plurality of user terminals that will participate in the communications session, a security option, a listen only option, a duration of the communications session, or an audio or a video compression parameter.

Another aspect of the disclosure provides a method for initiating a communications session in a scalable two-dimensional (2-D) telecommunications network architecture, the method including: receiving a session request, wherein the session request includes at least one user attribute; forwarding the session request to a controller, wherein the controller resides in a control plane; examining the session request to allocate at least one bandwidth or a data rate for a user switching node based on a resource allocation policy and to allocate a quantity of switch elements in an infrastructure switching node based on an interconnection policy; and establishing a communications session for a user terminal based on the session request, wherein the establishing the communications session is further based on the at least one user attribute.

In one example, the user terminal is a plurality of user terminals. In one example, the at least one user attribute includes the quantity of the plurality of user terminals that will participate in the communications session. In one example, the at least one user attribute includes the geographic locations of the plurality of user terminals that will participate in the communications session. In one example, the at least one user attribute includes one or more of the following: a security option, a listen only option for some of the plurality of user terminals, a duration of the communications session, or an audio or video compression parameter.

In one example, the user terminal is a plurality of user terminals, and further including assigning one or more user switching nodes and assigning one or more infrastructure switching node based on one or more of the following: a quantity of the plurality of user terminals, a respective geographic location of each of the plurality of user terminals, a bandwidth of the user switching node, or a bandwidth of the infrastructure switching node.

Another aspect of the disclosure provides a computer-readable medium storing computer executable code, operable on a device including at least one processor and at least one memory coupled to the at least one processor, wherein the at least one processor is configured to initiate a communications session, the computer executable code including: instructions for causing a computer to receive a session request, wherein the session request includes at least one user attribute; instructions for causing the computer to examine the session request and the at least one user attribute; instructions for causing the computer to allocate at least one bandwidth or a data rate for a user switching node based on a resource allocation policy; instructions for causing the computer to allocate a quantity of switch elements in an infrastructure switching node based on an interconnection policy; and instructions for causing the computer to establish a communications session for at least one user terminal based on the session request.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In one example, a telecommunications network is communications infrastructure comprised of a plurality of network elements for connecting a plurality of user terminals to each other. User terminals may be user devices for communication such as telephones, smartphones, computers, wireless devices, etc. Network elements may include transmission links and switching nodes. Transmission links may be, for example, wired transmission links (e.g., coaxial cable, twisted shielded pair wire, optical fiber, etc.) or wireless transmission links (e.g., radio, microwave, infrared, optical, etc.). Transmission links may include user connections (e.g. local links which connect user terminals to the network), infrastructure links (e.g., backhaul links which interconnect network elements), etc. Switching nodes may include telecommunication switches, routers, gateways, etc. to interconnect transmission links together and to user terminals. In one example, network elements are shared resources for all user terminals and thus may be managed to allow sharing using various network policies. One skilled in the art would understand that the examples listed herein are not exclusive and that other examples, although not explicitly listed herein in the present disclosure, may also be within the scope and spirit of the present disclosure.

Figure 1:
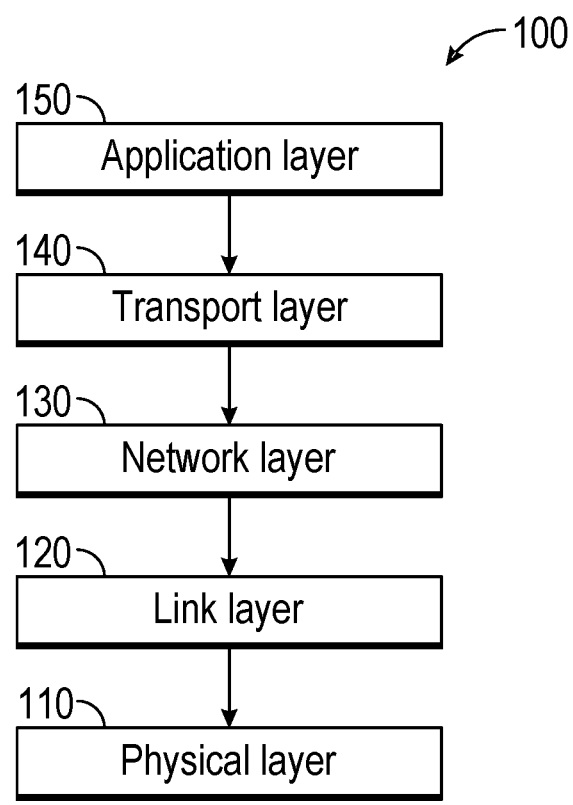
FIG. 1 illustrates an example of a hierarchical network model.

FIG. 1 illustrates an example of a hierarchical network model 100. The telecommunications network may employ a plurality of network protocols on different layers to perform various network services. As shown in FIG. 1, the hierarchical network model 100 includes a physical layer 110, a link layer 120, a network layer 130, a transport layer 140 and an application layer 150. A network protocol may be a set of pre-defined rules used by network elements and user terminals to perform various network services. For example, a layer is a group of network protocols used to provide specific network services in a hierarchical network model as shown in FIG. 1.

In one example, the hierarchical network model 100 depicts groups of network protocols as vertical layers where lower layers are closely related to physical transmission infrastructure (i.e., physical means of information transmission) and upper layers are closely related to user services. In general, network services from one layer may be carried by network services from another layer. For example, a link layer 120 provides basic data transport services over a limited area and an example link layer protocol is Ethernet. In general, the link layer 120 may be carried by a lower layer, such as a physical layer 110 which provides physical transmission facilities. Examples of a physical layer may include SONET/SDH, wireless, cellular, T1, etc.

The network layer 130, for example, may provide link connectivity and routing over a wide area using network addresses. An example of a network layer protocol is Internet Protocol (IP). In general, the network layer 130 may be carried by the link layer 120. In one example, a transport layer 140 provides end-to-end transport services over the wide area. Examples of transport layer protocols may include Transmission Control Protocol (TCP) and User Datagram Protocol (UDP). In one example, an application layer 150 provides end-to-end delivery of an application service between user terminals. Examples of application service may include telephony, videoconferencing, teleconferencing, Web browsing, email, data transfer, real time video, etc. One skilled in the art would understand that the examples disclosed herein of the different layer protocols are not exclusive and that other layer protocols may be within the scope and spirit of the present disclosure.

Figure 2:
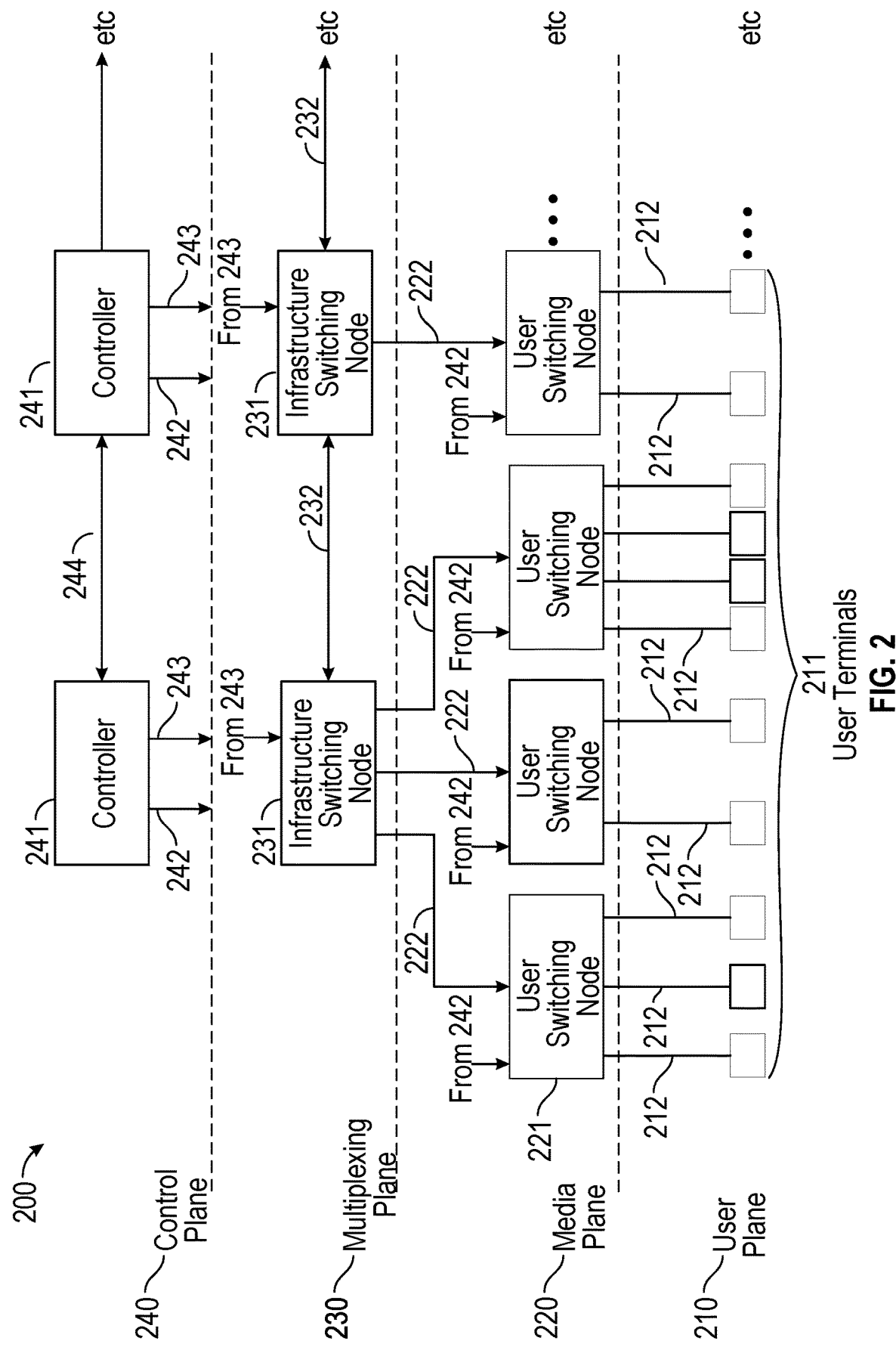
FIG. 2 illustrates an example of a network architecture with a plurality of planes.

FIG. 2 illustrates an example of a telecommunications network architecture 200 with a plurality of planes. In one example, the telecommunications network architecture may be decomposed into planes which are responsible for different functions. For example, the telecommunications network architecture 200 may include a plurality of planes. Each plane includes a grouping of functions which may be separately administered. For example, the telecommunications network architecture 200 may include a user plane 210, a media plane 220, a multiplexing plane 230, a control plane 240, etc. Although only four separate example planes are disclosed herein, the present disclosure does not exclude other planes within its spirit and scope. Also, other examples of telecommunications network architecture (which are within the spirit and scope of the present disclosure) may not include all four examples planes disclosed herein and/or may include other planes not mentioned herein. It should be noted that the example telecommunications network architecture 200 illustrated in FIG. 2 is merely notional and other architectures with other planes are covered by this present disclosure.

In one example, the user plane 210 may include user terminals 211 which are communication end user devices. The user terminals 211 allow end users to obtain user communication services such as voice, audio, video, data, multimedia, etc. A user terminal 211 may have a user connection 212 which delivers the communications services from the telecommunications network to the user terminal. In one example, the user connection 212 may be wired or wireless. For example, the user connection 212 may be an Ethernet LAN connection. In another example, the user connection 212 may be a WiFi (i.e., IEEE 802.11 wireless protocol) connection. In one example, the user connection 212 is a type of transmission link.

In one example, the media plane 220 may include user switching nodes 221 which aggregate a plurality of user connections 212 from the user plane 210. In one example, user switching nodes 221 may aggregate user connections 212 from a defined service area, for example, a local area network (LAN), a metropolitan area network (MAN), a local loop, a campus network, a business network, a home network, etc. In one example, the media plane 220 serves as an interface for the user plane 210 as a first aggregation layer. That is, the media plane 220 serves as at least one level of aggregation of user connections. In one example function, the media plane 220 handles direct connections to the user terminals 211. In one example, the user switching nodes 221 are a type of switching node.

The media plane 220 may use a plurality of media links 222 to transport communication services between the media plane 220 and the multiplexing plane 230. In one example, a plurality of user connections 212 may be aggregated onto one or more media links 222. For example, a media link 222 may have higher capacity than any of the user connections 212 and may allow multiplexing of user connections 212 onto the media links 222. In one example, the media link 222 may be wired or wireless. In one example, the media link 222 is a type of transmission link.

In one example, the multiplexing plane 230 may include infrastructure switching nodes 231 which aggregate and route a plurality of media links 222 from the media plane 220. In one example, the multiplexing plane 230 serves as an interface for the media plane 220 as a second aggregation layer. That is, the multiplexing plane 230 aggregates media links 222 from the media plane 220 which aggregates user connections 212 from the user plane 210. For example, the multiplexing plane may serve as a bridging plane to bridge the plurality of media links 222 from the media plane 220. In one example, the infrastructure switching nodes 231 are a type of switching node.

The multiplexing plane 230 may include a plurality of infrastructure links 232 to transport bulk traffic among a plurality of infrastructure switching nodes 231. In one example, bulk traffic may include one or more of aggregated user connections 212, aggregated media links 222 and/or overhead data. Examples of overhead data may include routing information, frame headers, synchronization words, parity words, control words, null bits, etc. In one example, a plurality of user connections 212 may be aggregated onto one or more media links 222. In one example, a plurality of media links 222 may be aggregated onto one or more infrastructure links 232. For example, an infrastructure link 232 may have higher capacity than any of the media links 222 In one example, the infrastructure links 232 may be wired or wireless. In one example, the infrastructure link 232 is a type of transmission link. In one example, the controllers may be interconnected by a control bus 244.

In one example, the control plane 240 may include a plurality of controllers 241. The controller 241 may configure the network elements based on various criteria. For example, a switching node such as the user switching node 221 and the infrastructure switching node 231 may have switch ports which are input interfaces and output interfaces for the switching node. In one example, an input switch port of one switching node may be connected to an output switch port of another switching node via a transmission link.

In one example, the control plane 240 may configure user switching nodes 221 and infrastructure switching nodes 231 to define switch connectivity between switch ports of both the user switching nodes 221 and infrastructure switching nodes 231. In one example, switch connectivity may include a transmission between an input switch port and an output switch port which is configured by the control plane 240. In one example, the switch connectivity may be configured a priori to commencement of a user communication service. In another example, the switch connectivity may be configured after commencement of a user communication service.

In one example, the control plane 240 may include first control lines 242 and second control lines 243. For example, the first control lines 242 may be used by controllers 241 to configure the user switching nodes 221. For example, the second control lines 243 may be used by controllers 241 to configure the infrastructure switching nodes 231. In one example, the first control lines 242 and second control lines 243 from a plurality of controllers 241 may be implemented as a distributed control network where the configuration of the user switching nodes 221 and the infrastructure switching nodes 231 is implemented by more than one controller 241 in the control plane 240. Alternatively, the first control lines 242 and second control lines 243 from one controller 241 may be implemented as a centralized control network where the configuration of the user switching nodes 221 and the infrastructure switching nodes 231 is implemented by one controller 241 in the control plane 240.

In one aspect, the present disclosure discloses a scalable layered two-dimensional telecommunications network architecture for enabling multi-party communication sessions (e.g., teleconferencing, videoconferencing, etc.). The telecommunications network architecture allows flexible expansion in a user plane as well as flexible expansion in a multiplexing plane by a distributed and dynamic control plane. The two dimensions of scalability include, for example, expansion in the media plane and expansion in the multiplexing plane. Alternatively, scalability may include expansion in the user plane and expansion in the control plane or various combinations of any of the four planes disclosed herein.

In one example, two or more user terminals 211 may want to participate in a communications session. A communications session may be a multilateral communications transaction with a start time $T_{start}$ where the communications session is initiated and a stop time $T_{stop}$ where the communications session is terminated. In one example, the communications session may be initiated or terminated by one of the user terminals 211 which may be denoted as a host. Thus, a host is defined as the user terminal that initiates the communications session. In addition, the communication session may be joined by a plurality of user terminals 211. In one example, each user terminal corresponds to a participant.

One example of a communications session is an audio or video teleconference where a plurality of user terminals 211 (e.g., at least two user terminals) are interconnected by a telecommunications network to implement a multi-party conference call. In one example, a multi-party conference call may be one of the following: an audio conference, a video conference, a multimedia conference, etc. In this example, the communications session may be initiated at a start time $T_{start}$ and may be terminated at a stop time $T_{stop}$.

In one example, operations in the telecommunications network may be governed by policies for network element behavior. For example, a resource allocation policy may prescribe how many resources may be allocated to a particular communications session. Examples of resources may include network elements such as transmission links and switching nodes.

In one example, a switching node, such as a user switching node or an infrastructure switching node, may be implemented as a plurality of switch elements, each with an elemental capacity C. A switch element is a constituent of a switching node. In one example, the elemental capacity C may be expressed in bits per second (bps). In another example, the elemental capacity C may be expressed in packets per second (pps). The allocation of a quantity N of switch elements for a communications session may be flexible such that the quantity N of switch elements may be selected according to the number of user terminals 211 in the communications session.

In one example scenario, a communications session among a plurality of user terminals 211 may be established using the following example sequence. A controller in a control plane may establish a resource allocation policy in a media plane for flexible expansion in the media plane. In one example, the resource allocation policy may set (e.g., or govern) a number (a.k.a., quantity) of user connections and/or a number (a.k.a., quantity) of user switching nodes based on the number (a.k.a., quantity) of user terminals that will participate in the communications session. In one example, the resource allocation policy may set (e.g., or govern) the media plane bandwidth, media plane data rate, user switching node bandwidth or user switching node data rate based on the number (a.k.a., quantity) of user terminals and/or the number (a.k.a., quantity) of user switching nodes in the communications session. In one example, resource allocation policy make take into account geographic locations of the user terminals and its respective quantity in a particular geographic location as well as the geographic locations of user switching nodes in assigning user switching nodes to user terminals and/or in allocating the media plane bandwidth, media plane data rate, user switching node bandwidth or user switching node data rate. In one example, the allocation of media plane bandwidth, media plane data rate, user switching node bandwidth and/or user switching node data rate is on the user connection (e.g., user connection 212 of FIG. 2).

In one example, the resource allocation policy may include either or both static/provisioned aspects or dynamic/runtime aspects. For example, static/provisioned aspects may include aspects known a priori to the start of the communications session or aspects that do not change over long time scales (i.e., time scales longer than an average communications session duration). For example, static/provisioned aspects may include (1) relative locations of network nodes and user terminals, (2) transmission link data rate, (3) transmission link type, (4) quantity of concurrent connections provisioned on transmission links, (5) provisioned capacity of network nodes (e.g. for media, multiplex, or record) relative to processor, memory, storage capability, network interface card type/quantity, hardware age, component electrical draw, presence of task specific chips (graphics, signal processing, etc.) (6) predefined rules for resource allocation on a per user or per account basis (e.g. calls for a given company/user should be hosted on certain servers, with known performance metrics, or statically allocate certain network nodes in expectation that this session will need a desired capacity, or allocate based on user/account billing selection, or allocate based on contract, including service level agreements), (7) exclusion of certain network nodes due to past poor performance or future maintenance needs, (8) security-based rules (e.g., encryption needs or levels of encryption), (9) desired audio/video compression scheme or codec, (10) firewall presence (e.g. for IP devices), (11) allocating based on regulatory environment of account holder, user terminal, network node location, account holder compliance demands, (12) software environment of network nodes, operating system, operating system platform (e.g., bare metal, virtual machine, container), resource contention, multi-tenant status (e.g., public cloud, private environment), (13) type and cost/profit basis of connection between user terminal and network nodes.

For example, dynamic/runtime aspects may include aspects that are known at the start of the communication sessions or aspects that change over short time scales (i.e., time scales less than an average communications session duration). For example, dynamic/runtime aspects may include: (1) inclusion or exclusion of allocation of certain network nodes based on recently measured performance metrics (e.g., processor/bandwidth/memory utilization, call quality, video quality relative to links or calls supported), (2) dynamic reservation rules (e.g based on business logic or other attributes) which are applied to certain network nodes while sessions are in progress to keep future and current sessions localized to certain network nodes, (3) detection of dynamic link quality change resulting in diversion to certain network nodes due to, for example, route changes or outage-based loss of link, (4) dynamic switching of compression scheme or codec during a session, (5) optimization of resource allocation dynamically, for example, periodic scan and re-optimization of system status Next, the controller may establish an interconnection policy for flexible expansion in a multiplexing plane. For example, the interconnection policy may allocate the number (a.k.a., quantity) of switch elements in an infrastructure switching node for a communications session based on the number (a.k.a., quantity) of user terminals in the communications session. In one example the number (a.k.a., quantity) of switch elements is proportional to the number (a.k.a., quantity) of user terminals. In one example, the interconnection policy may allocate one or more infrastructure switching nodes based on the geographic locations of user switching nodes that have been assigned to the communications session. In one example, the interconnection policy may allocate one or more infrastructure switching nodes based on the bandwidth and/or data rate of the user switching nodes that have been assigned to the communications session. In one example the bandwidth and/or data rate of the user switching node is on the media link (e.g., media link 222 shown in FIG. 2).

In one example, the interconnection policy may be based on a number of factors. For example, factors may include (1) provisioned transmission link quality and capacity, (2) observed or measured link quality or capacity (e.g. packet loss, jitter, latency), (3) network node hop distance, (4) link type, (5) availability of link protection on certain paths (e.g., border gateway protocol), (6) other link outages, (7) comparison of global and local optimization criteria for inter-connectivity, (8) type and cost/profit basis of interconnection, (9) local, regional, national or international regulatory requirements, (10) contractual considerations with account holders which could affect network node deployment, (11) provisioned capacity of network nodes (e.g. for media, multiplex, or record) relative to processor, memory, storage capability, network interface card type/quantity, hardware age, component electrical draw, presence of task specific chips (graphics, signal processing, etc.), (12) software environment of network nodes, operating system, operating system platform (e.g., bare metal, virtual machine, container), resource contention, multi-tenant status (e.g., public cloud, private environment), Utilizing the resource allocation policy in conjunction with the interconnection policy in determining how many resources may be allocated to a particular communications session for a plurality of communications sessions allow a two-dimensional flexible expansion of resources.

Figure 3:
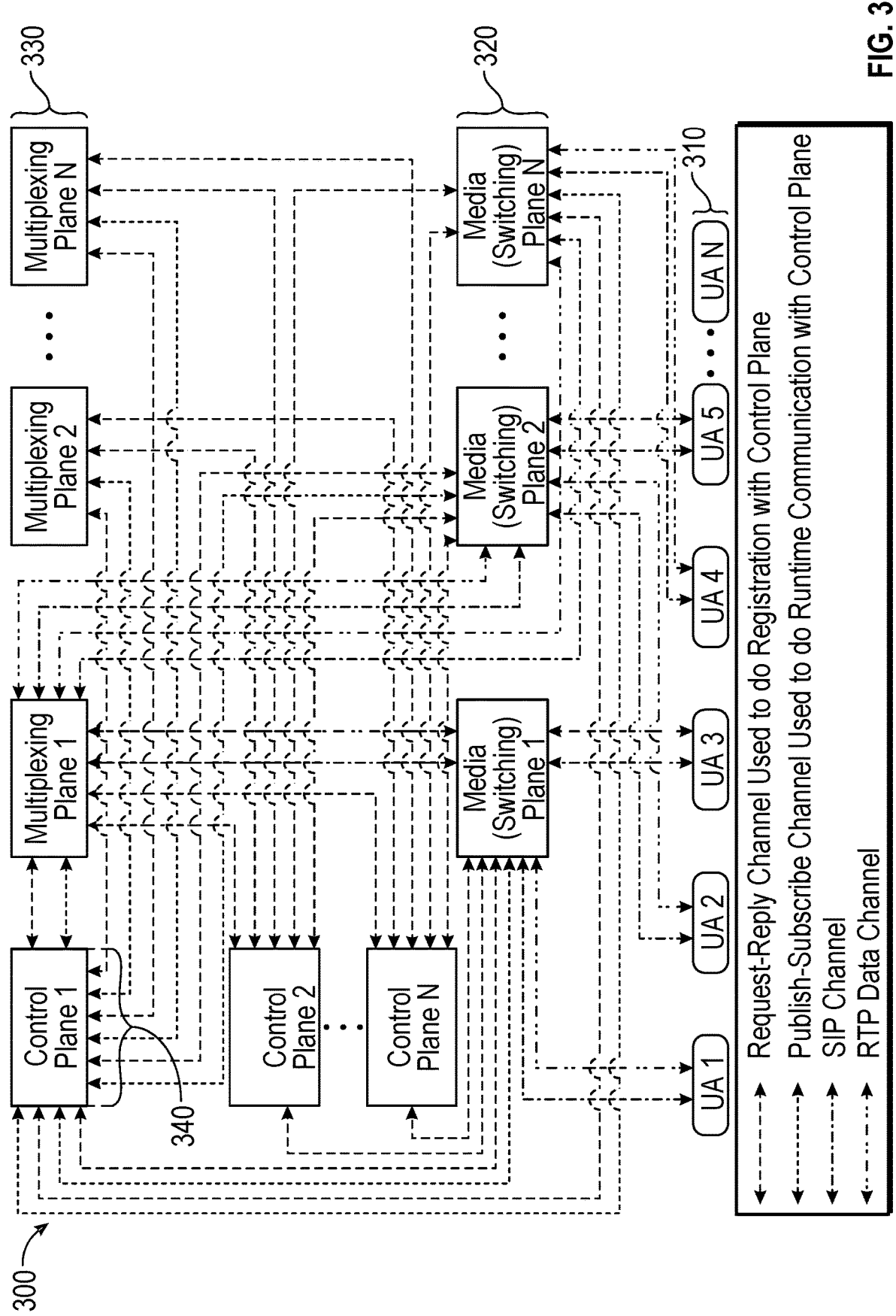
FIG. 3 illustrates an example network architecture signaling diagram with a plurality of planes.

FIG. 3 illustrates an example network architecture signaling diagram 300. In this network architecture signaling diagram 300, a plurality of user agents 310 is shown in the bottom of FIG. 3. For example, the user agents 310 are part of a user plane and serve as surrogates or interface devices for a plurality of user terminals (not shown). In one example, the user agents 310 may be implemented by a processor and memory with software.

In one example, a plurality of media (switching) plane elements 320 are shown above the user agents 310. For example, each media (switching) plane element 320 may include one or more user switching nodes (not shown). And, the media (switching) plane elements 320 and the user agents 310 are interconnected with Real-time Transport Protocol (RTP) data channels (e.g., for user traffic such as voice, audio, video, etc.) and Request-Reply channels (e.g., for resource allocation messages). In one example, RTP is a protocol for streaming audio, video, multimedia, etc. traffic across a network with network delays constrained to achieve virtual real-time traffic transport.

In one example, a plurality of multiplexing plane elements 330 is shown above the media plane elements 320. For each multiplexing plane element 330 may include one or more infrastructure switching nodes (not shown). And, the multiplexing plane elements 330 and the media (switching) plane elements 320 are interconnected with RTP data channels (e.g. for user traffic).

In one example, a plurality of control plane elements 340 is shown on the left side of FIG. 3. For example, each control plane element 340 may include one or more controllers (not shown). And the control plane elements 340 interconnect with both the multiplexing plane elements 330 and the media (switching) plane elements 320 with Request-Reply channels (e.g., for resource allocation messages), Publish-Subscribe channels (e.g., for runtime communication with the control plane elements 340), and Session Initiation Protocol (SIP) channels (e.g., for signaling and control messages for each communication session). In one example, SIP and RTP data channels are between media (switching) plane elements 320 and multiplexing plane elements 330, or between user agents 310 and media (switching) plane elements 320.

Figure 4:
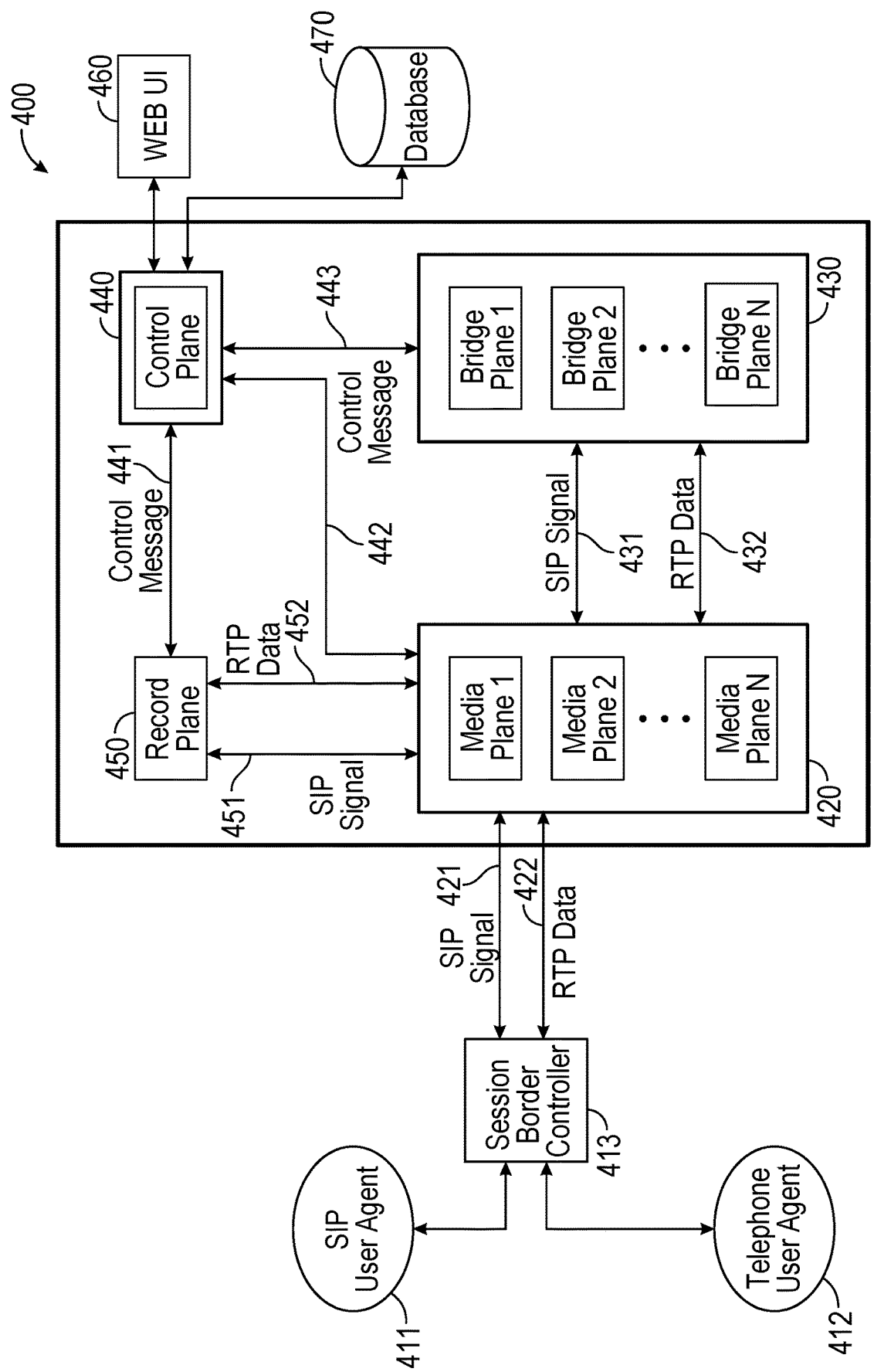
FIG. 4 illustrates an example of a network architecture implementation.

FIG. 4 illustrates an example of a network architecture implementation 400. For example, two types of user agents are shown on the left side of FIG. 4: a SIP User Agent 411 and a telephone user agent 412. In one example, the SIP User Agent 411 serves as a surrogate or interface device for a user terminal (not shown) which employs a SIP channel for signaling and control messages. In one example, the telephone user agent 412 serves as a surrogate or interface device for a user terminal (not shown) which employs telephony signaling.

In one example, the SIP User Agent 411 and telephone user agent 412 connect to a Session Border Controller (SBC) 413. For example, the SBC 413 controls signaling for session setup, transmission, and teardown. In one example, the SBC 413 connects to media plane elements 420 using a first SIP signal 421 and a first RTP data signal 422. For example, each media plane element 420 may include one or more user switching nodes (not shown).

For example, the media plane elements 420 connect to multiplexing plane elements 430 using a second SIP signal 431 and a second RTP data signal 432. For example, each multiplexing plane element 430 may include one or more infrastructure switching nodes (not shown). In one example, the second SIP signal 431 may be the same as the first SIP signal 421. In one example, the second RTP data signal 432 may be the same as the first RTP data signal 431. For example, record plane elements 450 connect to media plane elements 420 using a third SIP signal 451 and a third RTP data signal 452.

For example, control plane elements 440 connect to record plane elements 450 with first control messages 441, to media plane elements 420 with second control messages 442, and to multiplexing plane elements 430 with third control messages 443. For example, the control plane elements 440 may also connect to a Web user interface (UI) 460 and a database 470.

In one example, the record plane elements 450 record sessions individually or in a multiplexed fashion. For example, the control plane elements 440 may direct the record plane elements 450 to allocate resources (e.g., bandwidth, storage capacity) to receive an incoming stream and record the incoming stream to storage. For example, the control elements 440 may also instruct the media plane elements 420 to connect to the record plane elements 450 to send streams over the network for recording.

Figure 5:
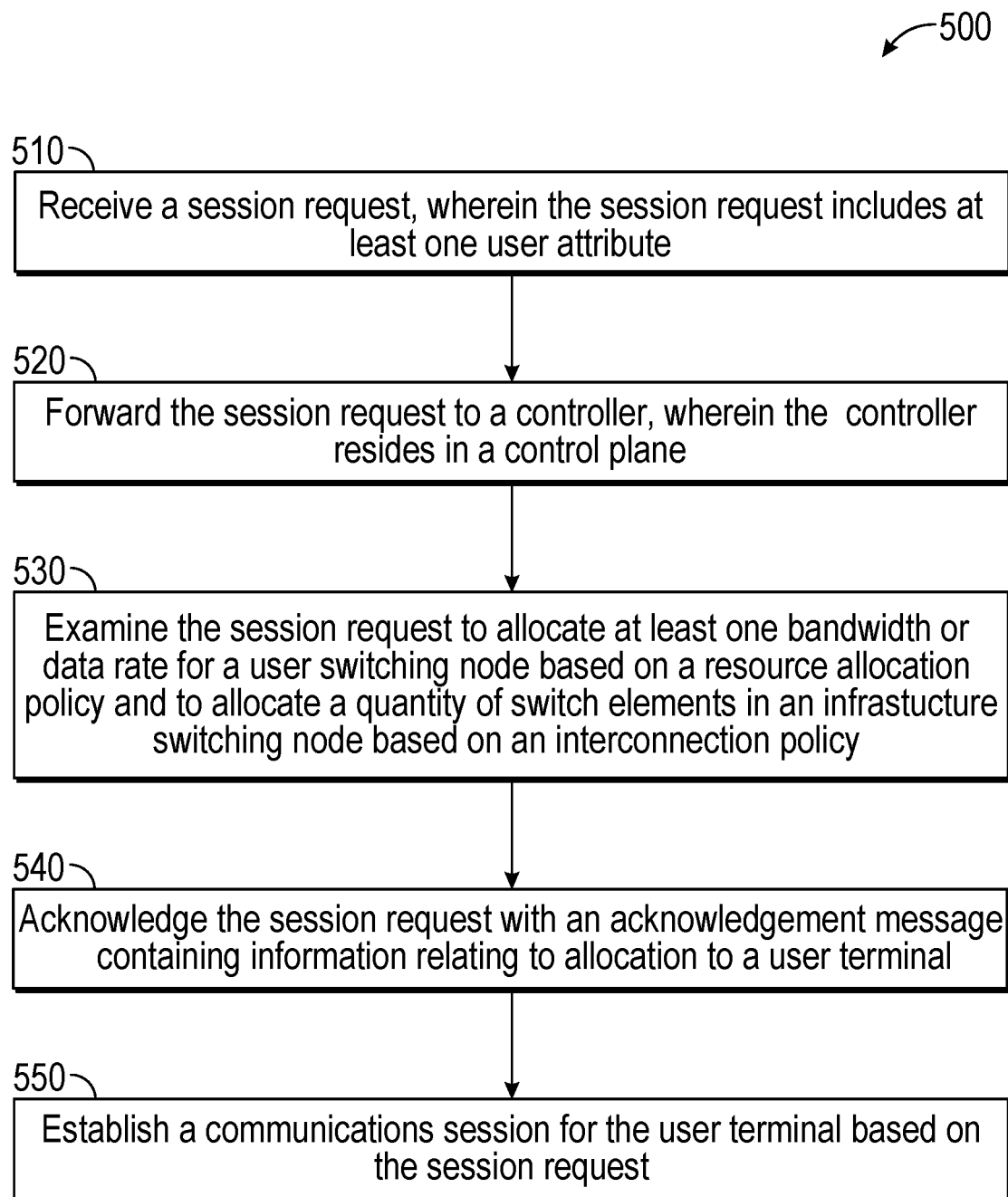
FIG. 5 illustrates an example flow diagram for initiating a communications session in a scalable two-dimensional (2-D) telecommunications network architecture.

FIG. 5 illustrates an example flow diagram 500 for initiating a communications session in a scalable two-dimensional (2-D) telecommunications network architecture. In block 510, receive a session request, wherein the session request includes at least one user attribute. In one example, the session request is sent by a user terminal, wherein the user terminal resides in a user plane. In one example, the at least one user attribute includes the number (e.g., quantity) of user terminals that will participate in a communications session. In one example, the at least one user attribute includes the geographic locations of a plurality of user terminals that will participate in the communications session. In one example, the at least one user attribute includes one or more of the following: security options, listen-only options for some of the user terminals, duration of the communications session, audio/video compression parameters, user identifiers (e.g. phone number, email address, SIP URL), user device capabilities (e.g., codec), geolocation of user terminal (e.g via IP address or phone number), link or connection type used by user terminal, security enablement, privacy enablement (e.g., phone number delisting), dual tone multi-frequency (DTMF) inband or out of band support, codec switching capability (e.g. due to link quality status), firewall status (e.g. for IP devices), user role (e.g. leader, host, guest, attendee), authentication options (e.g., password, biometric data), user based affiliations (e.g. corporate ties, group affiliation, reseller identifiers, white-label options), etc.

In one example the session request is a composite of multiple session requests from multiple user terminals that will participate in the communications session. In one example, the session request is received at a user switching node residing in a media plane. In the example where the session request is a composite of multiple session requests from multiple user terminals, multiple user switching nodes may be the recipients of the multiple session requests.

In block 520, forward the session request to a controller, wherein the controller resides in a control plane. In one example, the user switching node residing in the media plane forwards the session request to the controller.

In block 530, examine the session request to allocate at least one bandwidth or data rate for a user switching node based on a resource allocation policy and to allocate a number (a.k.a., quantity) of switch elements in an infrastructure switching node based on an interconnection policy. In one example, the allocating step includes assigning a user switching node and assigning an infrastructure switching node, for example, based on the quantity of user terminals and their respective geographic locations. In one example, the allocating step is based on the bandwidth of the user switching node and/or the bandwidth of the infrastructure switching node. In one example, the controller examines the session request. In one example, the interconnection policy is based on the number (a.k.a., quantity) of user terminals in the communications session.

In block 540, acknowledge the session request with an acknowledgement message containing information relating to allocation to the user terminal. In one example, the allocation relates to one or more of the following: assigning of at least one bandwidth or data rate for a user switching node based on a resource allocation policy, allocating the number (a.k.a., quantity) of switch elements in an infrastructure switching node based on an interconnection policy, the assigning of user switching node(s), user connection(s), media link(s), and/or infrastructure switching node(s).

In one example, the controller performs the acknowledgement. In another example, the user switching node performs the acknowledgement. In yet another example, the infrastructure switching node performs the acknowledgement. In one example, the acknowledgement is an option.

In block 550, establish a communications session for the user terminal based on the session request. In one example, the user terminal includes more than one user terminals. In one example, the establishing the communications session is further based on the at least one user attribute; that is, the at least one user attribute is taken into account when establishing the communications session.

One skilled in the art would understand that the examples of FIGS. 2, 3, 4 which illustrate the architectures of the user plane, media plane, multiplexing plane and control plane and the unlimited quantities of user terminals, user switching nodes, infrastructure switching nodes and controllers allow a two-dimensional (2-D) scalability. In one aspect, one or more of the architectural components (e.g., user switching nodes, infrastructure switching nodes, and/or controllers) may be components which are part of a network cloud.

In one aspect, FIG. 5 may be executed by one or more processors which may include hardware, software, firmware, etc. The one or more processors, for example, may be used to execute software or firmware needed to perform the steps in the flow diagram of FIG. 5. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for a scalable telecommunications network architecture.

Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A scalable network architecture, comprising
   a non-transitory media plane, with at least one media plane element, for receiving a session request with at least one user attribute;
   a non-transitory multiplexing plane, with at least one multiplexing plane element, coupled to the media plane;
   a non-transitory record plane, with at least one record plane element, for recording one or more sessions to storage; and
   a non-transitory control plane, with at least one control plane element, for examining the session request to allocate a media plane resource based on a resource allocation policy, to allocate a multiplexing plane resource based on an interconnection policy, wherein the resource allocation policy and the interconnection policy are interdependent, and to allocate a record plane resource for recording.

2. The scalable network architecture of claim 1, wherein the recording one or more sessions to storage is performed individually.

3. The scalable network architecture of claim 1, wherein the recording one or more sessions to storage is performed in a multiplexed fashion.

4. The scalable network architecture of claim 1, wherein the resource allocation policy allocates at least one bandwidth or at least one data rate for the media plane resource using at least one first control line.

5. The scalable network architecture of claim 4, wherein the resource allocation policy includes a user terminal quantity of a plurality of user terminals that will participate in a communication session and wherein the resource allocation policy determines a first quantity of user connections and a second quantity of user switching nodes.

6. The scalable network architecture of claim 5, wherein the resource allocation policy determines a bandwidth or a data rate of at least one user connection from the first quantity of user connections.

7. The scalable network architecture of claim 5, wherein the resource allocation policy includes geographic locations of each of the plurality of user terminals and geographic locations of the at least one user switching node and determines an assignment of at least one user switching node to one or more of the plurality of user terminals.

8. The scalable network architecture of claim 1, wherein the interconnection policy allocates a quantity of switch elements in the multiplexing plane resource using at least one second control line.

9. The scalable network architecture of claim 8, wherein the interconnection policy determines a user terminal quantity of a plurality of user terminals that will participate in a communication session.

10. The scalable network architecture of claim 9 wherein a quantity of switch elements in the multiplexing plane resource is proportional to the user terminal quantity.

11. A method for initiating a session in a scalable network architecture, the method comprising:
   receiving a session request, wherein the session request includes at least one user attribute;
   forwarding the session request to a control plane;
   examining the session request to configure a media plane element based on a resource allocation policy using at least one first control line and to configure a multiplexing plane element based on an interconnection policy using at least one second control line, wherein the resource allocation policy and the interconnection policy are interdependent;
   establishing a session for at least one user terminal based on the session request; and
   recording the session to storage using a record plane element.

12. The method of claim 11, wherein establishing the session is further based on the at least one user attribute.

13. The method of claim 11, wherein recording the session to storage is performed individually.

14. The method of claim 13, wherein the at least one user attribute includes a quantity of the plurality of user terminals that will participate in the session.

15. The method of claim 13, wherein the at least one user attribute includes geographic locations of the plurality of user terminals that will participate in the session.

16. The method of claim 13, wherein the at least one user attribute includes one or more of the following: a security option, a listen only option for some of the plurality of user terminals, a duration of the session, or an audio or video compression parameter.

17. The method of claim 11, wherein recording the session to storage is performed in a multiplexed fashion.

18. The method of claim 11, wherein the at least one user terminal is a plurality of user terminals.

19. The method of claim 11, wherein the at least one user terminal is a plurality of user terminals, a further comprising assigning one or more media plane elements and assigning one or more multiplexing plane elements based on one or more of the following: a quantity of the plurality of user terminals, a respective geographic location of each of the plurality of user terminals, a data rate of the media plane element, or a data rate of the multiplexing plane element.

20. A non-transitory computer-readable medium storing computer executable code, operable on a device comprising at least one processor and at least one memory coupled to the at least one processor, wherein the at least one processor is configured to initiate a session, the computer-executable code comprising:
   instructions of causing a computer to receive a session request, wherein the session request includes at least one user attribute;
   instructions for causing the computer to examine the session request and the at least one user attribute;
   instructions for causing the computer to configure a media plane element based on resource allocation policy;
   instructions for causing the computer to configure a multiplexing plane element based on an interconnection policy, wherein the resource allocation policy and the interconnection policy are interdependent;
   instructions for causing the computer to establish a session for at least one user terminal based on the session request; and
   instructions for causing the computer to configure a record plane element to record the session.

\* \* \* \* \*